(12) United States Patent
Satish et al.

(10) Patent No.: US 9,246,887 B1
(45) Date of Patent: *Jan. 26, 2016

(54) METHOD AND APPARATUS FOR SECURING CONFIDENTIAL DATA FOR A USER IN A COMPUTER

(71) Applicant: Symantec Corporation, Mountain View, CA (US)

(72) Inventors: Sourabh Satish, Fremont, CA (US); Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 14/330,842

(22) Filed: Jul. 14, 2014

Related U.S. Application Data

(63) Continuation of application No. 11/729,398, filed on Mar. 28, 2007, now Pat. No. 8,782,403.

(51) Int. Cl.
| | |
|---|---|
| *H04L 29/06* | (2006.01) |
| *G06F 21/62* | (2013.01) |
| *G06F 1/26* | (2006.01) |
| *G06F 11/00* | (2006.01) |
| *G08B 13/00* | (2006.01) |
| *H04N 7/167* | (2011.01) |

(52) U.S. Cl.
CPC ........ *H04L 63/0435* (2013.01); *G06F 21/6227* (2013.01)

(58) Field of Classification Search
CPC .................... G06F 21/6218; G06F 2221/2107; G06F 21/6209; G06F 21/10; H04L 63/0428
USPC .............................. 713/165; 726/36; 380/229
See application file for complete search history.

(56) References Cited

U.S. PATENT DOCUMENTS

2007/0118892 A1 * 5/2007 Sastry ................. H04L 63/0823 726/10
2007/0261099 A1 * 11/2007 Broussard ............. H04L 63/102 726/1

* cited by examiner

*Primary Examiner* — Evans Desrosiers
(74) *Attorney, Agent, or Firm* — Wilmer Cutler Pickering Hale and Dorr LLP

(57) ABSTRACT

Method and apparatus for securing confidential data related to a user in a computer is described. In one example, rules are obtained that provide a representation of the confidential data. A storage system in the computer is searched using the rules to detect a file having at least a portion of the confidential data. The file is encrypted the in-place within the storage system using symmetric encryption based on a secret associated with the user.

20 Claims, 3 Drawing Sheets

METHOD AND APPARATUS FOR SECURING CONFIDENTIAL DATA FOR A USER IN A COMPUTER

CROSS-REFERENCE TO RELATED APPLICATIONS

This patent application is a continuation of U.S. patent application Ser. No. 11/729,398, filed Mar. 28, 2007, which is hereby incorporated by reference herein in its entirety.

BACKGROUND OF THE INVENTION

1. Field of the Invention

Embodiments of the invention generally relate to computers. More specifically, this disclosure relates to a method and apparatus for securing confidential data for a user in a computer.

2. Description of the Related Art

More and more information is being stored in digital form on a computer or in a computer network. For example, users are storing more and more personal and confidential information on their computers. Such confidential information, however, is susceptible to unauthorized access by other users of the computers. If the computer is connected to a network, such as the Internet, such confidential information may be even more susceptible to unauthorized access. As such, users desire to protect their confidential data in digital form.

Current implementations for protecting confidential data for a user are based on the user identifying what files he or she wants to protect. Once the files are identified by the user, a tool is used to protect the files. For example, the files may be encrypted. In such implementations, it is up to the user to identify the files having confidential data and to initiate file protection. This results in the user having to constantly manage sensitive files. Moreover, a user may inadvertently forget to protect the files using the provided tool. Accordingly, there exists a need in the art for a method and apparatus for securing confidential data for a user on a computer that addresses the aforementioned problems.

SUMMARY OF THE INVENTION

Method and apparatus for securing confidential data related to a user in a computer is described. In one embodiment, rules are obtained that provide a representation of the confidential data. A storage system in the computer is searched using the rules to detect a file having at least a portion of the confidential data. The file is encrypted in-place within the storage system using symmetric encryption based on a secret associated with the user.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
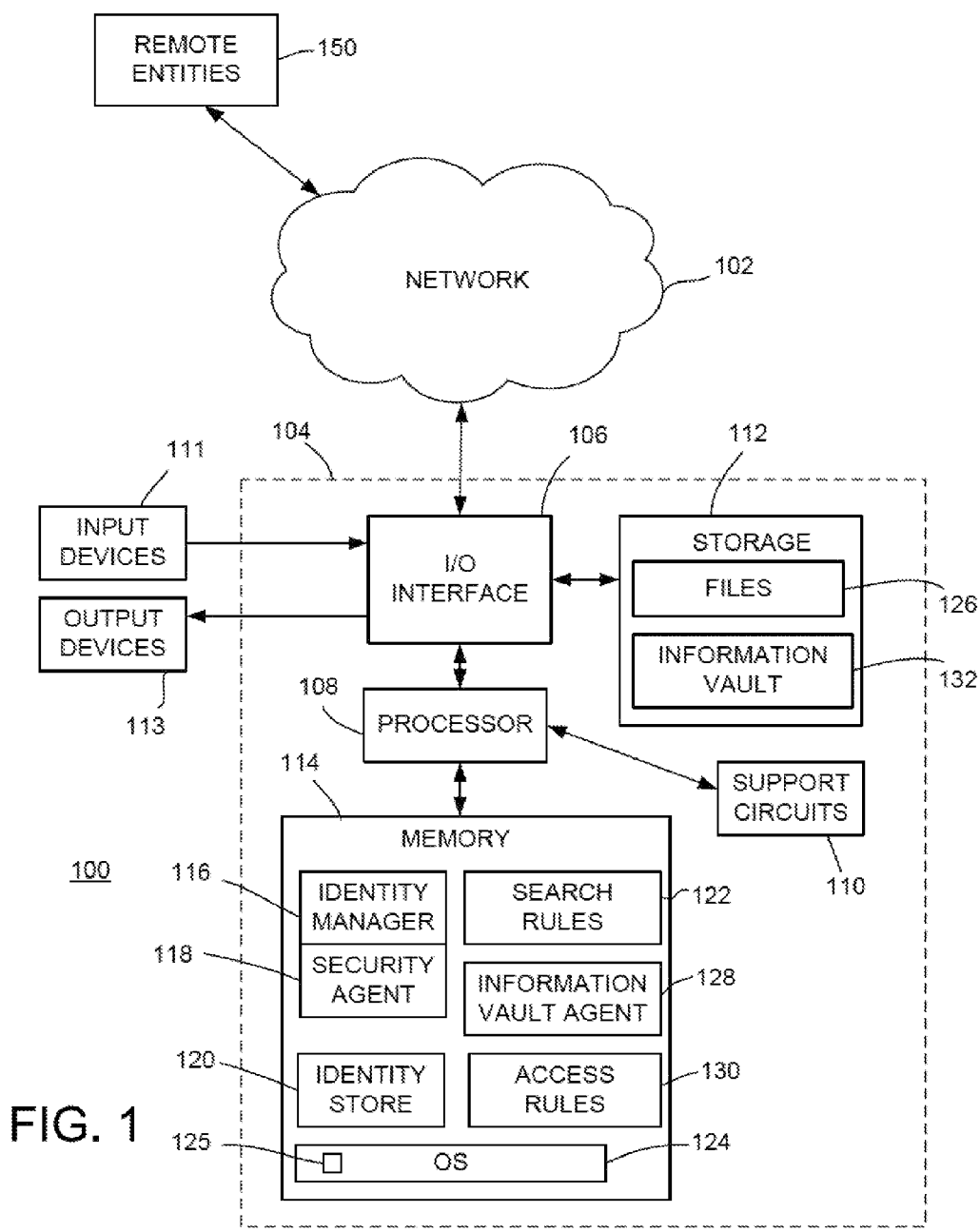
FIG. 1 is a block diagram depicting an exemplary embodiment of a networked computer system in accordance with one or more aspects of the invention.

FIG. 1 is a block diagram depicting an exemplary embodiment of a networked computer system 100 in accordance with one or more aspects of the invention. The system 100 includes a network 102 coupled to a computer 104. The computer 104 illustratively includes a processor 108, a memory 114, various support circuits 110, an I/O interface 106, and a storage system 112. The processor 108 may include one or more microprocessors known in the art. The support circuits 110 for the processor 108 include conventional cache, power supplies, clock circuits, data registers, I/O interfaces, and the like. The I/O interface 106 may be directly coupled to the memory 114 or coupled through the processor 108. The I/O interface 106 may also be configured for communication with input devices 111 and/or output devices 113, such as, network devices, various storage devices, mouse, keyboard, display, and the like. The I/O interface 106 is also coupled to the network 102 and the storage system 112. The storage system 112 may include one or more storage devices, such as one or more disk drives. The network 102 comprises a communication system that connects computer systems by wire, cable, fiber optic, and/or wireless links facilitated by various types of well-known network elements, such as hubs, switches, routers, and the like. The network 102 may employ various well-known protocols to communicate information. For example, the network 102 may be part of the Internet. The computer 104 may communicate with various remote entities 150 via the network.

The memory 114 stores processor-executable instructions and/or data that may be executed by and/or used by the processor 108. These processor-executable instructions may comprise hardware, firmware, software, and the like, or some combination thereof. Modules having processor-executable instructions that are stored in the memory 114 may include an identity manager 116, security agent 118, and information vault agent 128. The computer 104 may be programmed with an operating system 124, which may include OS/2, Java Virtual Machine, Linux, Solaris, Unix, HPUX, AIX, Windows, Windows 95, Windows 98, Windows NT, and Windows 2000, Windows ME, Windows XP, Windows Server, among other known platforms. At least a portion of the operating system 124 may be disposed in the memory 114. The memory 114 may include one or more of the following random access memory, read only memory, magneto-resistive read/write memory, optical read/write memory, cache memory, magnetic read/write memory, and the like, as well as signal-bearing media as described below.

The identity manager 116 is configured to manage digital identities for one or more users of the computer 104. The identity manager 116 establishes and maintains objects associated with the digital identities. When transmitted over the network 102 to remote entities 150, each of the digital identities is represented by a security token (also referred to as a token). A token includes one or more claims, each of which includes some part of the total information conveyed by the digital identity. For example, a token may include claims for a username, a password, credit card numbers, and/or a myriad of other types of information. The tokens may be in a variety of different formats, such as X.509 certificates, Kerberos tickets, and the like. A token may also be created using a standard language, such as the Security Assertion Markup Language (SAML). One example of an identity manager is MICROSOFT CARDSPACE, which provides an easy to understand metaphor. The CARDSPACE identity manager enables users to create "cards" (i.e., objects) that represent their profile information, which in turn is used to create security tokens that can be submitted to entities over the network 102. Information related to digital identities may be stored in the identity store 120. Some or all of the information may be stored in the identity store 120 securely (e.g., the information is encrypted). Although MICROSOFT CARDSPACE is described as an example, it is to be understood that the invention may be used with digital identities used in other types of digital identity standards, such as OpenID, Lightweight Identity Protocol (LID), Simple Extensible Identity Protocol (SXIP), and the like.

The security agent 118 may be part of the identity manager 116 or may be a separate module. The security agent 118 is configured to identify confidential data in digital identities maintained by the identity manager 116. Typically, all of the information conveyed by the digital identity is deemed to be confidential. Such confidential information may include, for example, a username, a password, a credit card number, a social security number, a private key used to sign the digital identity, and the like. In essence, the confidential data includes any information that can be used to compromise the digital identity, the user, and/or the relying party. The security agent 118 obtains the confidential data from the identity manager 116 and creates rules to be used in searching for instances of the confidential data in the storage system 112 ("search rules 122").

Use of the identity manager 116 and the security agent 118 is just one example of a mechanism for automatic generation of relevant search rules. It is to be understood that other mechanisms may be used to create of search rules. For example, search rules may be explicitly created by the user using a text editor or other type of application (e.g., dedicated application that allows a user to create search rules for confidential data). In a multi-user setting, search rules may be created for one or more users by an administrator user using any type of application suitable for creation of the search rules. Those skilled in the art will appreciate that the search rules 122 may be created in a myriad of different ways.

In some embodiments, the information vault agent 128 is configured obtain the search rules 122 and search files 126 in the storage system 112 using the search rules 122 to detect instances of confidential data. The information vault agent 128 protects any files identified in the search as containing confidential information using a conditional access mechanism. Embodiments of the conditional access mechanism are described below. Thus, the information vault agent 128 effectively creates and maintains an information vault 132 in the storage system 112, where the information vault 132 includes protected files. The information vault agent 128 may perform the search automatically in accordance with a schedule. Alternatively, the information vault agent 128 may perform the search for each newly received and/or modified search rule. The information vault agent 128 may also perform the search using any search rules obtained once for all existing files and then in real time for each newly created file and/or each modified file in the storage system 112. The information vault agent 128 may also use a combination of such search triggers.

In some embodiments, for each file identified during the search as having confidential data, the information vault agent 128 encrypts the file using a symmetric encryption algorithm. Any symmetric encryption algorithm known in the art may be employed, such as the Advanced Encryption Standard (AES), Data Encryption Standard (DES), triple DES (3DES), and like type algorithms. For each identified file, the information vault agent 128 generates a random key for encryption. The information vault agent 128 protects the random key using a secret associated with the user. In some embodiments, the random key is encrypted using a symmetric encryption algorithm. The key used to encrypt the random key is derived from a credential used by the user to establish a user session on the computer.

In one embodiment, the information vault agent 128 achieves the encryption of the confidential data using built in facilities of the operating system 124. For example, file encryption may be built into the particular file system implemented by the operating system 124. In one embodiment, encrypting file system (EFS) file encryption is employed (also referred to as NTFS file encryption) as part of a MICROSOFT WINDOWS operating system. The operating system 124 includes a cryptographic application programming interface (API) 125, which can be used to protect files stored in the file system. One such cryptographic API is the data protection API (DPAPI) provided as part of some MICROSOFT WINDOWS operating systems and used as part of EFS file encryption. To protect a file, the information vault agent 128 passes the file to the cryptographic API 125. The cryptographic API 125 is configured to generate a random key and encrypt the file using symmetric encryption. The cryptographic API 125 then encrypts the random key using another key derived from the user's credential, such as a user password used to logon to the operating system 124 (or a hash of such user password). The user's credential may be obtained automatically from the current user session. The cryptographic API 125 may use any type of key derivation algorithm known in the art for deriving a key from the user's credential, such as PBKDF2 described in RFC 2898. When the user accesses the protected file, the protected file is passed to the cryptographic API 125, which uses the user's credential to recover the key that encrypts the random key. Having recovered the random key, the cryptographic API 125 recovers the file. Using the cryptographic API 125 provides for seamless decryption of the protected files in the information vault 132.

Many home users, however, have a single account on the operating system 124 that is used by many users. Thus, the multiple users do not have specific user credentials used to establish user sessions. Thus, in another embodiment, the information vault agent 128 establishes a credential for the cryptographic API 125 to use. For example, the information vault agent 128 may install a credential service provider (CSP) as a DPAPI extension. The information vault agent 128 establishes the credential by prompting the user to select a secret. The secret may be a personal identification number (PIN), password, biometric scan, or the like. The identified files are protected using the cryptographic API 125, as described above, with the exception that the information vault agent 128 passes the credential to the cryptographic API 125.

When the user attempts to access a protected file for the first time, the information vault agent 128 intercepts the access request and prompts the user for the established credential. If the user enters the proper credential, the information vault agent 128 associates the credential with the user session. Such an association may be temporary. Thereafter, the user can access the file or other files protected using the established credential without being prompted for the credential. The protected files are recovered using the cryptographic API 125, as described above, with the exception that the user's credential is only temporarily associated with the user session. The credential may be disassociated with the user session in response to various events, such as inactivity, detection of idle threads, security events and/or alerts, or the like.

The information vault agent 128 advantageously provides a mechanism for searching confidential data on a user's computer and using in-place encryption to protect files having such confidential data. The user is not required to interface with another application to protect files identified as having confidential data, such as an application that requires the user to drag-and-drop files into an encrypted folder or volume of the disk. Rather, the files may be automatically encrypted in-place on the disk without user intervention. Moreover, the user is not required to navigate to a special folder or volume and extract the protected files. Rather, the files can be accessed like any other file stored on the system (i.e., the protected files require no special handling on the part of the user). From the point of view of the user, decryption of the protected files happens silently and behind-the-scene. Furthermore, the user is not required to generate and keep track of any special encryption keys to ensure that the protected data remains accessible. Such encryption keys are maintained seamlessly by the system without intervention by the user. In some cases, the user need only remember his or her logon password and/or a pin or other secret chosen by the user.

Figure 2:
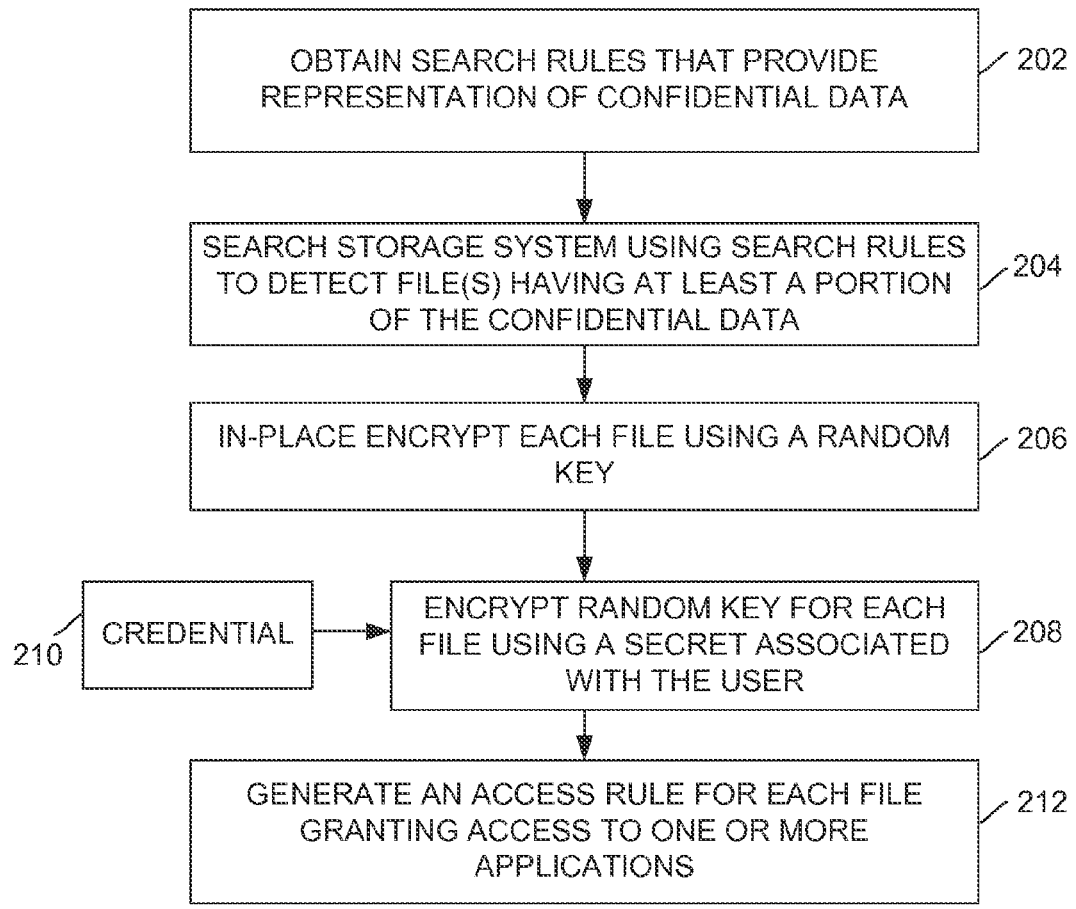
FIG. 2 is a flow diagram depicting an exemplary embodiment of a method for securing confidential data related to a user in a computer in accordance with one or more aspects of the invention.

FIG. 2 is a flow diagram depicting an exemplary embodiment of a method 200 for securing confidential data related to a user in a computer in accordance with one or more aspects of the invention. The method 200 begins at step 202, where search rules are obtained that provide a representation of the confidential data. At step 204, a storage system in the computer is searched using the search rules to detect one or more files having at least a portion of the confidential data. At step 206, each of the identified files is encrypted in-place on the file system using a random key. The random key may be different for each encrypted file. In some embodiments, the encryption performed at step 206 is achieved using built in facilities of an operating system in the computer (e.g., NTFS file encryption). This encryption may be performed automatically without intervention by the user.

At step 208, the random key used to encrypt each file is itself encrypted using a secret associated with the user. In one embodiment, a random key is encrypted by deriving a key from a credential 210 for the user. The credential may be used by the user to establish a user session on the computer. Alternatively, the credential may be specified by the user. The key derived from the credential 210 is then used to encrypt the random key. In this manner, files identified as having confidential information associated with the user are protected, along with the encryption keys used to protect the files. If the encryption at step 206 was achieved using built-in facilities of the operating system, such protection of the random key at step 208 is done seamlessly by such built-in facilities.

Figure 3:
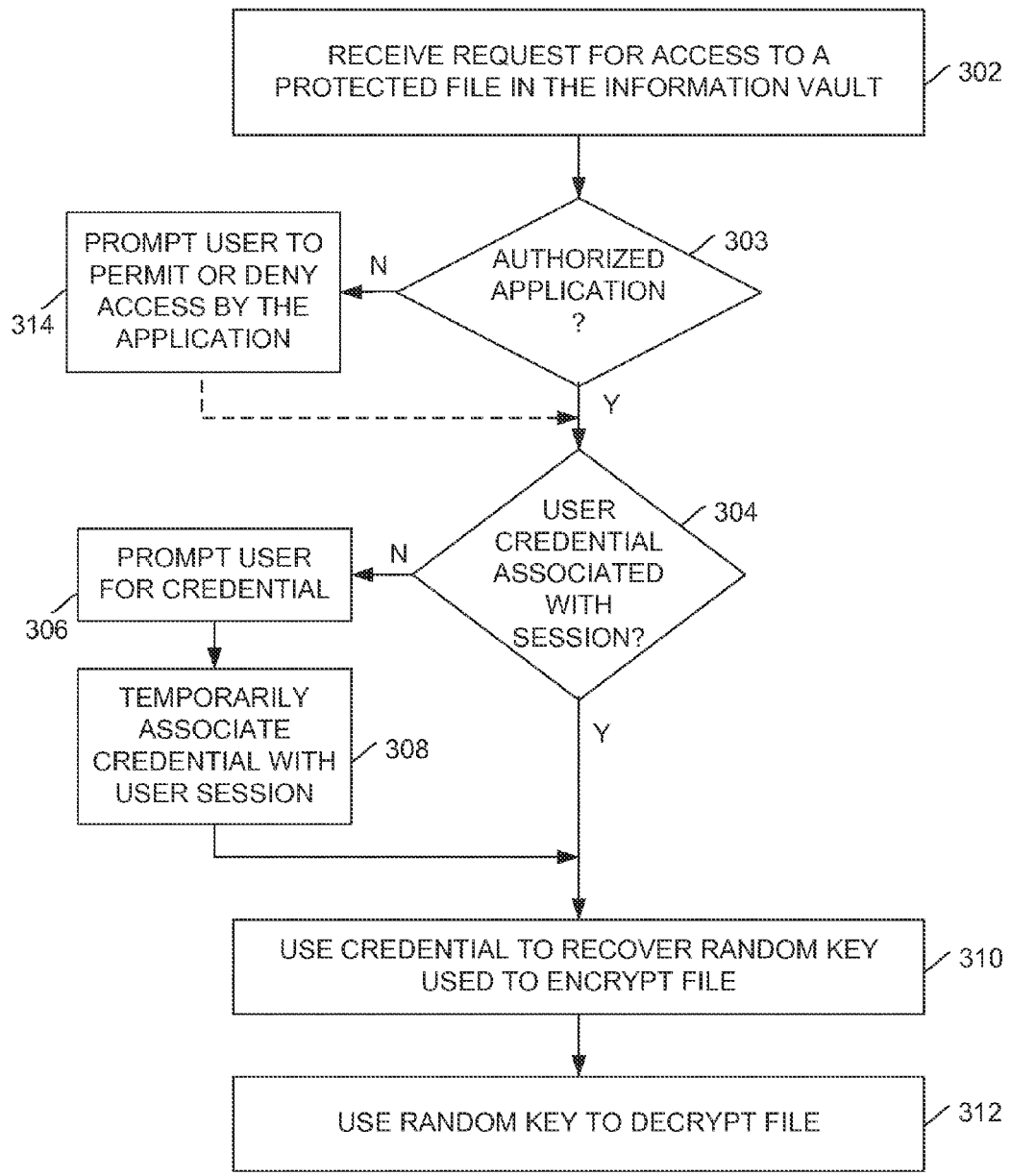
FIG. 3 is a flow diagram depicting an exemplary embodiment of a method for recovering protected files in accordance with one or more aspect of the invention.

FIG. 3 is a flow diagram depicting an exemplary embodiment of a method 300 for recovering protected files in accordance with one or more aspect of the invention. The method 300 begins at step 302, where access to a protected file is requested. At step 304, a determination is made whether a credential for the user has been associated with the user session. For example, the user may have used the credential to establish the user session. Alternatively, the credential may have been entered by the user and temporarily associated with the user session. If the credential has not been associated, the method 300 proceeds to step 306. At step 306, the user is prompted for the credential. In this case, the user has not used the credential to establish the user session. Thus, at step 308, the credential entered by the user is temporarily associated with the user session. If the credential has been associated, the method 300 proceeds to step 310. At step 310, the credential is used to recover the random key used to encrypt the file. At step 312, the recovered random key is used to decrypt the file. Thus, in some embodiments, the method 300 is performed completely without intervention by the user. The user merely accesses the protected file like any other file and the protected file is decrypted and presented, as appropriate. In other embodiments, the user may have to enter a credential if the user has not otherwise entered such credential to logon to the operating system. Actual decryption of the file, however, still happens without user intervention.

Returning to FIG. 1, as described above, the user credential used to protect the keys for the protected files in the information vault 132 is associated with the user session. The credential may have been used to establish the session (e.g., user logon) or the credential may have been temporarily associated with the session. In either case, applications running on the operating system 124 during the user session may obtain the credential and recover the protected files without authorization (e.g., "malware"). Thus, in some embodiments, the information vault agent 128 is configured to create and manage process-level access rules ("access rules 130"). The access rules 130 include learned rules, predefined rules, or a combination of learned rules and predefined rules. To learn rules, the information vault agent 128 identifies one or more applications associated with each file being protected. For example, the information vault 128 may identify the application that created the file being protected. The information vault 128 may identify any other application that has an association with the file due to the file type/extension. For example, the information vault 128 may identify a file "foo.doc" as a MICROSOFT WORD document. The access rules are configured to give these applications the right to access the protected file. In some embodiments, any changes in file type and application association are detected by the information vault agent 128, which prompts the user for authorization.

In some embodiments, the information vault agent 128 also establishes predefined access rules that identify commonly known applications that should be granted access to the protected files. Such common applications include, for example, backup applications, system tools, and the like. In addition, the information vault agent 128 may configure the particular rights each application allowed by the access rules 130 has. For example, some applications (e.g., the commonly known applications granted access by the predefined rules) may only be granted read access to the protected file, whereas the learned applications may be granted both read and write access. When an application attempts to access a protected file in the information vault 132, the information vault agent 128 checks the application against the access rules 130. The information vault agent 128 allows access to the protected file if the access rules 130 so permit. If the application is not allowed access by the access rules 130, the information vault agent 128 may prompt the user to permit or deny access (either temporarily or permanently). In some embodiments, the information vault agent 128 may be configured by the user to silently approve or disapprove applications attempting to access a protected file. This may improve the user's experience, but at the cost of less security.

Returning to FIG. 2, in some embodiments one or more applications may be associated with each of the files at step 312. The association between application(s) and file are stored as access rules. Returning to FIG. 3, in some embodiments, a determination may be made whether an application is authorized to access the file based on the access rules at step 303. If not, the method 300 proceeds to step 314, where the user is prompted to deny or permit access by the application. If the user permits access, the method 300 proceeds from step 314 to step 304. Otherwise, the access to the protected file is denied. If at step 303 the application is authorized to access the protected file based on the access rules, the method 300 proceeds to step 304.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

The invention claimed is:

1. An article of manufacture for securing confidential data, the article of manufacture comprising:
   at least one non-transitory processor readable storage medium; and
   instructions stored on the at least one medium;
   wherein the instructions are configured to be readable from the at least one medium by at least one processor and thereby cause the at least one processor to operate so as to:
      access a first digital identity defining confidential information associated with a first individual and maintained by an identity manager;
      generate a first plurality of search rules based on the confidential information defined by the first digital identity;
      search a plurality of files in a storage system using the first plurality of search rules to detect a file having at least a portion of the confidential information;
      encrypt the file using a first encryption key associated with the first digital identity;
      receive a request to access the file comprising a credential during a session;
      authenticate the request based on the credential and the first encryption key; and
      associate the first encryption key with the session.

2. The article of manufacture of claim 1, wherein the confidential information is a social security number of the first individual associated with the first digital identity, and wherein a search rule of the first plurality of search rules is configured to detect at least a portion of the social security number of the first individual associated with the first digital identity.

3. The article of manufacture of claim 1, wherein the first encryption key is a symmetric encryption key based on a secret associated with the first individual.

4. The article of manufacture of claim 1, wherein encrypt the file using a first encryption key further comprises encrypt the file in-place within the storage system using a cryptographic application programming interface to the storage system implemented by the operating system on the computer.

5. The article of manufacture of claim 1, wherein the instructions cause the at least one processor to operate further so as to:
   identify an application associated with the file; and
   determine an access rule for granting access to the file by the application.

6. The article of manufacture of claim 5, wherein the instructions cause the at least one processor to operate further so as to:
   receive a request to access the file from the application;
   determine whether the application is authorized to access the file by comparing the request to access the file to the access rule for granting access to the file;
   grant access to the file if the application is authorized; and
   provide a user prompt for entering a credential to access the file if the application is not authorized.

7. The article of manufacture of claim 1, wherein the instructions cause the at least one processor to operate further so as to:
   disassociate the first encryption key from the session in response to a designated event.

8. A system for securing confidential data comprising:
   one or more processors communicatively coupled to a network; wherein the one or more processors are configured to:
      access a first digital identity defining confidential information associated with a first individual and maintained by an identity manager;
      generate a first plurality of search rules based on the confidential information defined by the first digital identity;
      search a plurality of files in a storage system using the first plurality of search rules to detect a file having at least a portion of the confidential information;
      encrypt the file using a first encryption key associated with the first digital identity;
      receive a request to access the file comprising a credential during a session;
      authenticate the request based on the credential and the first encryption key; and
      associate the first encryption key with the session.

9. The system of claim 8, wherein the confidential information is a social security number of the first individual associated with the first digital identity, and wherein a search rule of the first plurality of search rules is configured to detect at least a portion of the social security number of the first individual associated with the first digital identity.

10. The system of claim 8, wherein the first encryption key is a symmetric encryption key based on a secret associated with the first individual.

11. The system of claim 8, wherein encrypt the file using a first encryption key further comprises encrypt the file in-place within the storage system using a cryptographic application programming interface to the storage system implemented by the operating system on the computer.

12. The system of claim 8, wherein the one or more processors are further configured to:
   identify an application associated with the file; and
   determine an access rule for granting access to the file by the application.

13. The system of claim 12, wherein the one or more processors are further configured to:

receive a request to access the file from the application;
determine whether the application is authorized to access the file by comparing the request to access the file to the access rule for granting access to the file;
grant access to the file if the application is authorized; and
provide a user prompt for entering a credential to access the file if the application is not authorized.

14. The system of claim 8, wherein the one or more processors are further configured to:
disassociate the first encryption key from the session in response to a designated event.

15. A method for securing confidential data comprising:
accessing a first digital identity defining confidential information associated with a first individual and maintained by an identity manager;
generating a first plurality of search rules based on the confidential information defined by the first digital identity;
searching a plurality of files in a storage system using the first plurality of search rules to detect a file having at least a portion of the confidential information;
encrypting the file using a first encryption key associated with the first digital identity, wherein the first encryption key is a symmetric encryption key based on a secret associated with the first individual;
receiving a request to access the file comprising a credential during a session;
authenticating the request based on the credential and the first encryption key; and
associating the first encryption key with the session.

16. The method of claim 15, wherein the confidential information is a social security number of the first individual associated with the first digital identity, and wherein a search rule of the first plurality of search rules is configured to detect at least a portion of the social security number of the first individual associated with the first digital identity.

17. The method of claim 15, wherein encrypting the file using a first encryption key further comprises encrypting the file in-place within the storage system using a cryptographic application programming interface to the storage system implemented by the operating system on the computer.

18. The method of claim 15, further comprising:
identifying an application associated with the file; and
determining an access rule for granting access to the file by the application.

19. The method of claim 18, further comprising:
receiving a request to access the file from the application;
determining whether the application is authorized to access the file by comparing the request to access the file to the access rule for granting access to the file;
granting access to the file if the application is authorized; and
providing a user prompt for entering a credential to access the file if the application is not authorized.

20. The method of claim 15, further comprising:
disassociating the first encryption key from the session in response to an event.

\* \* \* \* \*